US011859100B2

(12) United States Patent
Grottenmueller et al.

(10) Patent No.: US 11,859,100 B2
(45) Date of Patent: Jan. 2, 2024

(54) SURFACE COATING COMPOSITIONS

(71) Applicant: MERCK PATENT GMBH, Darmstadt (DE)

(72) Inventors: Ralf Grottenmueller, Weiterstadt (DE); Yvonne Ott, Dietzenbach (DE); Martin Roeder, Egelsbach (DE)

(73) Assignee: MERCK PATENT GMBH, Darmstadt (DE)

( * ) Notice: Subject to any disclaimer, the term of this patent is extended or adjusted under 35 U.S.C. 154(b) by 89 days.

(21) Appl. No.: 17/442,692

(22) PCT Filed: Mar. 24, 2020

(86) PCT No.: PCT/EP2020/058120
§ 371 (c)(1),
(2) Date: Sep. 24, 2021

(87) PCT Pub. No.: WO2020/193529
PCT Pub. Date: Oct. 1, 2020

(65) Prior Publication Data
US 2022/0119678 A1 Apr. 21, 2022

(30) Foreign Application Priority Data
Mar. 26, 2019 (EP) .................................. 19165274

(51) Int. Cl.
C09D 183/16 (2006.01)
C09D 7/20 (2018.01)
C09D 7/63 (2018.01)
C08G 77/62 (2006.01)
C08K 5/136 (2006.01)
C08K 5/41 (2006.01)
C08K 5/13 (2006.01)
C08G 77/60 (2006.01)

(52) U.S. Cl.
CPC ........... *C09D 183/16* (2013.01); *C08G 77/62* (2013.01); *C08K 5/13* (2013.01); *C08K 5/136* (2013.01); *C08K 5/41* (2013.01); *C09D 7/20* (2018.01); *C09D 7/63* (2018.01); *C08G 77/60* (2013.01)

(58) Field of Classification Search
CPC ......... C09D 183/16; C08L 83/16; C08K 5/13; C08K 5/132; C08K 5/136; C08G 77/60
USPC ....... 524/588, 323, 324, 325, 326, 330, 333, 524/334, 335, 336, 342, 343, 344; 528/29
See application file for complete search history.

(56) References Cited

U.S. PATENT DOCUMENTS

| 3,043,798 | A |   | 7/1962  | Boyer et al. |
| 3,243,404 | A | * | 3/1966  | Martellock ............. C08L 83/04 524/588 |
| 3,590,021 | A | * | 6/1971  | Bush ........................ C07F 7/21 556/412 |
| 5,256,487 | A |   | 10/1993 | Myers et al. |

FOREIGN PATENT DOCUMENTS

EP          398049 A2 * 11/1990

OTHER PUBLICATIONS

International Search Report for PCT/EP2020/058120 dated Jun. 9, 2020.

* cited by examiner

Primary Examiner — Marc S Zimmer
(74) Attorney, Agent, or Firm — MILLEN, WHITE, ZELANO & BRANIGAN, P.C.; Brion P. Heaney

(57) ABSTRACT

The present invention relates to new coating compositions for the preparation of functional surface coatings on various base material substrates. The coating compositions are based on a silazane-containing polymer and a non-polymeric phenolic compound comprising at least two and not more than four aromatic units in its molecular structure. The coating compositions provide improved physical and chemical surface properties and may be applied by user-friendly coating methods.

26 Claims, No Drawings

SURFACE COATING COMPOSITIONS

TECHNICAL FIELD

The present invention relates to new coating compositions which are based on a silazane-containing polymer and a specific non-polymeric phenolic compound. The coating compositions are particularly suitable for the preparation of functional coatings on various base material substrates to provide improved physical and chemical surface properties such as, in particular, improved mechanical resistance and durability (including improved surface hardness, improved scratch resistance and/or improved abrasion resistance); improved wetting and adhesion properties (including hydro- and oleophobicity, easy-to-clean effect and/or anti-graffiti effect); improved chemical resistance (including improved corrosion resistance (e.g. against solvents, acidic and alkaline media and corrosive gases) and/or improved anti-oxidation effect); improved optical effects (improved light fastness); and improved physical barrier or sealing effects.

Beyond that, further beneficial surface properties may be obtained or may be improved by functional coatings which are prepared from the coating composition according to the present invention such as, e.g. antistatic effect, anti-staining effect, anti-fingerprint effect, anti-fouling effect, anti-microbial effect, smoothening effect, and/or optical effects.

Furthermore, the coating compositions show high adhesion to various substrate surfaces and they allow an easy application by user-friendly coating methods so that functional surface coatings with various film thicknesses may be obtained in an efficient and easy manner under mild conditions.

The present invention further relates to a method for preparing a coated article using said coating composition and to a coated article which is prepared by said method. There is further provided for the use of said composition for forming a functional coating on the surface of a base material, thereby improving one or more of the above-mentioned specific surface properties.

BACKGROUND OF THE INVENTION

Polymers with silazane repeating units —[$SiR_2$—NR'—] are typically referred to as polysilazanes. If all substituents R and R' are hydrogen, the material is called perhydropolysilazane (PHPS) and, if at least one of R and R' is an organic moiety, the material is called organopolysilazane (OPSZ). PHPS and OPSZ are used for a variety of functional coatings to impart certain properties to surfaces, such as e.g. anti-graffiti effect, scratch resistance, corrosion resistance or hydro- and oleophobicity. Hence, silazanes are widely used for functional coatings for various applications.

Whilst polysilazanes are composed of one or more different silazane repeating units, polysiloxazanes additionally contain one or more different siloxane repeating units. Polysiloxazanes combine features of polysilazane and polysiloxane chemistry and behavior. Polysilazanes and polysiloxazanes are resins that are used for the preparation of functional coatings for different types of application.

Typically, both polysilazanes and polysiloxazanes are liquid polymers which become solid at molecular weights of ca. >10,000 g/mol. In most applications, liquid polymers of moderate molecular weights, typically in the range from 2,000 to 8,000 g/mol, are used. For preparing solid coatings from such liquid polymers, a curing step is required which is carried out after applying the material on a substrate, either as a pure material or as a formulation.

Polysilazanes or polysiloxazanes can be crosslinked by hydrolysis, for example, by reaction with moisture from the air. This leads to an increasing molecular weight and to a solidification or curing of the material. For this reason, the terms "curing" and "crosslinking" and the corresponding verbs "cure" and "crosslink" are interchangeably used as synonyms in the present application when referred to silazane based polymers such as e.g. polysilazanes and polysiloxazanes. Usually, curing is performed by hydrolysis under ambient conditions or at elevated temperatures. Cured polysilazanes show excellent adhesion, high hardness and good scratch resistance.

Phenolic resins have been known for decades and are usually synthesized by condensation reactions of phenolic compounds (e.g. phenol, kresols, xylenols or alkyl-phenols) and aldehydes (e.g. formaldehyde or acetaldehyde) or ketones (e.g. acetone). Phenolic resins are divided into two groups: (1) novolacs are synthesized by acidic catalysts and are soluble, meltable, and non-self-crosslinking resins; and (2) resoles are synthesized by alkaline catalysts and are characterized by the presence of hydroxymethyl groups. Resoles are duroplastic materials, which can self-crosslink at higher temperatures. After curing and crosslinking, phenolic resins form a three-dimensional network and form insoluble, non-meltable solid materials. Cured phenolic resins have excellent thermomechanical stability, good dimensional stability and good chemical resistance.

One big drawback of pure polysilazanes is the limited film thickness without crack formation. On the other hand, phenolic resins can form solid parts of big dimensions with good hardness. The problem to be solved is the limited compatibility of silazanes and phenolic resins. Silazanes have slightly basic Si—NH—Si groups and phenolic resins have slightly acidic Ar—OH groups which in combination are non-compatible and form insoluble amorphous acid-base complexes precipitating as white pulp as soon as both polymers are mixed. Nevertheless, various hybrid systems based on polysilazanes and phenolic resins have been described in the past.

"Tb4: Kion® Polysilazanes—Reactivity with phenolic resins", published by Kion Corp. via the internet, discusses the reactivity of organopolysilazanes and phenolic resins. Here, a special reaction mechanism is proposed, which discourages direct mixing of the polymers. Instead, it is recommended to precure the phenolic resin to a solid and less reactive material or to react the phenolic resin with an isocyanate compound to block the slightly acidic Ar—OH groups and to add the organopolysilazane afterwards.

R. Devasia, Materials Chemistry and Physics 212, 2018, 175-186 deals with the synthesis and ceramic conversion of novel silazane modified phenol formaldehyde resins. However, here resole type phenolic resins are used for the preparation of ceramic materials after pyrolysis at temperatures of >1,000° C.

U.S. Pat. No. 5,089,552 describes a material formed by a chemical reaction of organopolysilazanes and phenolic resins. Water is used as reagent to crosslink low molecular weight cyclic silazanes and high molecular weight phenolic resins to obtain thermally stable materials with high char yields at temperatures of >1,000° C.

U.S. Pat. No. 3,590,021 relates to a process for the preparation of a nitrogen-containing organosilicon compound comprising reacting (i) an organic or organosilicon material containing at least one ≡COH and/or ≡SiOH group and (ii) an organosilicon compound represented by

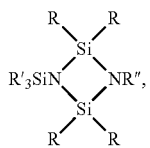

wherein each R and each R' represent an alkyl radical containing less than 6 carbon atoms, an alkenyl radical containing less than 7 carbon atoms or a monocyclic aryl radical and R" represents a hydrogen atom or an alkyl radical containing less than 12 carbon atoms.

U.S. Pat. No. 3,423,361 relates to a process for the production of high molecular weight thermoplastic silicic acid polyesters, wherein a silicic acid ester silazane is reacted with an equimolar amount of a dihydroxy compound at a temperature of from 20 to 440° C.

However, the known hybrid systems do not satisfy the requirements of modern high-performance coating systems for the preparation of functional coatings. Disadvantages are the limited miscibility and compatibility of polysilazane and phenolic resin components as well as a reduced hardness and scratch resistance, if high amounts of phenolic resins used. Further drawbacks are that the known hybrid systems often give cloudy coating films and show unsatisfactory results when applied by conventional coating methods, such as, for example, wiping, dip coating, spray coating, spin-coating, etc.

OBJECT OF THE INVENTION

Hence, it is an object of the present invention to overcome the disadvantages in the prior art and to provide new coating compositions which are particularly suitable for the preparation of functional surface coatings on various base materials to provide improved physical and chemical surface properties such as, in particular, improved mechanical resistance and durability (including improved surface hardness, improved scratch resistance and/or improved abrasion resistance); improved wetting and adhesion properties (including hydro- and oleophobicity, easy-to-clean effect and/or anti-graffiti effect); improved chemical resistance (including improved corrosion resistance (e.g. against solvents, acidic and alkaline media and corrosive gases) and/or improved anti-oxidation effect); improved optical effects (improved light fastness); and improved physical barrier or sealing effects.

Beyond that, it is desirable to obtain additional or further improve beneficial surface properties such as, e.g. antistatic effect, anti-staining effect, anti-fingerprint effect, anti-fouling effect, smoothening effect, and/or optical effects.

Moreover, it is an object of the present invention to provide new coating compositions which, in addition to the above-mentioned advantages, show high adhesion to various substrate surfaces and allow an easy and trouble-free application by user-friendly coating methods so that functional surface coatings with high film thickness can be obtained in an efficient and easy manner under mild conditions, while avoiding unwanted clouding of the prepared coating films.

It is a further object of the present invention to provide a method for preparing coated articles and coated articles which are prepared by said method having the above-mentioned advantages.

Finally, it is an object of the present invention to provide coating compositions which can be used for forming functional coatings on surfaces of various base materials to improve one or more of the aforementioned surface properties, specifically corrosion resistance, for example against solvents, acidic and alkaline media and corrosive gases; surface hardness; and scratch resistance.

SUMMARY OF THE INVENTION

The present inventors have surprisingly found that the above objects are solved, either individually or in any combination, by a coating composition, comprising:
  (i) a silazane-containing polymer; and
  (ii) a non-polymeric phenolic compound;
  wherein the non-polymeric phenolic compound comprises at least two and not more than four aromatic units, preferably two, three or four aromatic units, in its molecular structure.

The coating compositions of the present invention are clear, homogeneous and storage-stable formulations of silazane-phenolic hybrid systems in organic solvents, which can be applied by conventional coating methods such as e.g. spray coating, dip coating, spin coating, slit or slot coating, inkjet printing or other coating methods and which can be easily cured to functional surface coatings at ambient conditions or at elevated temperatures of up to 200° C. To ensure good solubility after mixing the silazane-containing polymer with the phenolic component, non-polymeric phenolic compounds having not more than four aromatic units in their molecular structure should be chosen as phenolic component.

In addition, a method for preparing a coated article is provided, wherein the method comprises the following steps:
(a) applying a coating composition according to the present invention to a surface of an article; and
(b) curing said coating composition to obtain a coated article.

Moreover, a coated article is provided, which is obtainable or obtained by the above-mentioned preparation method.

The present invention further relates to the use of a coating composition according to the present invention for forming a functional coating on a surface of a base material.

Preferred embodiments of the invention are described in the dependent claims.

DETAILED DESCRIPTION

Definitions

The term "polymer" includes, but is not limited to, homopolymers, copolymers, for example, block, random, and alternating copolymers, terpolymers, quaterpolymers, etc., and blends and modifications thereof. Furthermore, unless otherwise specifically limited, the term "polymer" shall include all possible configurational isomers of the material. These configurations include, but are not limited to isotactic, syndiotactic, and atactic symmetries. A polymer is a molecule of high relative molecular mass, the structure of which essentially comprises the multiple repetition of units (i.e. repeating units) derived, actually or conceptually, from molecules of low relative mass (i.e. monomers). Typically, the number of repeating units is higher than 10, preferably higher than 20, in polymers. If the number of repeating units is less than 10, the polymers may also be referred to as oligomers.

The term "monomer" as used herein, refers to a molecule which can undergo polymerization thereby contributing constitutional units (repeating units) to the essential structure of a polymer.

The term "homopolymer" as used herein, stands for a polymer derived from one species of (real, implicit or hypothetical) monomer.

The term "copolymer" as used herein, generally means any polymer derived from more than one species of monomer, wherein the polymer contains more than one species of corresponding repeating unit. In one embodiment the copolymer is the reaction product of two or more species of monomer and thus comprises two or more species of corresponding repeating unit. It is preferred that the copolymer comprises two, three, four, five or six species of repeating unit. Copolymers that are obtained by copolymerization of three monomer species can also be referred to as terpolymers. Copolymers that are obtained by copolymerization of four monomer species can also be referred to as quaterpolymers. Copolymers may be present as block, random, and/or alternating copolymers.

The term "block copolymer" as used herein, stands for a copolymer, wherein adjacent blocks are constitutionally different, i.e. adjacent blocks comprise repeating units derived from different species of monomer or from the same species of monomer but with a different composition or sequence distribution of repeating units.

Further, the term "random copolymer" as used herein, refers to a polymer formed of macromolecules in which the probability of finding a given repeating unit at any given site in the chain is independent of the nature of the adjacent repeating units. Usually, in a random copolymer, the sequence distribution of repeating units follows Bernoullian statistics.

The term "alternating copolymer" as used herein, stands for a copolymer consisting of macromolecules comprising two species of repeating units in alternating sequence.

The term "polysilazane" as used herein, refers to a polymer in which silicon and nitrogen atoms alternate to form the basic backbone. Since each silicon atom is bound to at least one nitrogen atom and each nitrogen atom to at least one silicon atom, both chains and rings of the general formula —[$SiR^1R^2$—$NR^3$-]$_m$ (silazane repeating unit) occur, wherein $R^1$ to $R^3$ may be hydrogen atoms, organic substituents or heteroorganic substituents; and m is an integer. If all substituents $R^1$ to $R^3$ are hydrogen atoms, the polymer is designated as perhydropolysilazane, polyperhydrosilazane or inorganic polysilazane (—[$SiH_2$—NH—]$_m$). If at least one substituent $R^1$ to $R^3$ is an organic or heteroorganic substituent, the polymer is designated as organopolysilazane.

The term "polysiloxazane" as used herein, refers to a polysilazane which additionally contains sections in which silicon and oxygen atoms alternate.

Such sections may be represented, for example, by —[O—$SiR^7R^8$—]$_n$, wherein $R^7$ and $R^8$ may be hydrogen atoms, organic substituents, or heteroorganic substituents; and n is an integer. If all substituents of the polymer are hydrogen atoms, the polymer is designated as perhydropolysiloxazane. If at least one substituents of the polymer is an organic or heteroorganic substituent, the polymer is designated as organopolysiloxazane.

The term "functional coating" as used herein refers to coatings which impart one or more specific properties to a surface. Generally, coatings are needed to protect surfaces or impart specific effects to surfaces. There are various effects which may be imparted by functional coatings. For example, mechanical resistance, surface hardness, scratch resistance, abrasion resistance, anti-microbial effect, anti-fouling effect, wetting effect (towards water), hydro- and oleophobicity, smoothening effect, durability effect, antistatic effect, anti-staining effect, anti-fingerprint effect, easy-to-clean effect, anti-graffiti effect, chemical resistance, corrosion resistance, anti-oxidation effect, physical barrier effect, sealing effect, heat resistance, fire resistance, low shrinkage, UV-barrier effect, light fastness, and/or optical effects.

The term "cure" means conversion to a crosslinked polymer network (for example, through irradiation or catalysis).

The term "aromatic unit" as used herein, relates to a monocyclic or polycyclic aromatic or heteroaromatic system which forms part of the molecular structure of a chemical compound. Polycyclic aromatic systems include two or more connected aromatic ring systems which are fixed in one plane. Heteroaromatic systems contain one or more heteroatoms selected from N, O, S and P. The aromatic unit may be unsubstituted or substituted, preferably with one or more substituents selected from hydroxyl, alkyl, phenyl and fluorine. The aromatic unit is typically linked via one or more chemical bonds to adjacent structural moieties of the chemical compound. The person skilled in the art is familiar with the terms and concepts "aromatic" and "non-aromatic".

The term "aryl" as used herein, means a mono-, bi- or tricyclic aromatic or heteroaromatic group which may be substituted. Heteroaromatic groups contain one or more heteroatoms (e.g. N, O, S and/or P) in the heteroaromatic system.

Preferred Embodiments

The present invention relates to a coating composition, comprising:
(i) a silazane-containing polymer; and
(ii) a non-polymeric phenolic compound;
wherein the non-polymeric phenolic compound comprises at least two and not more than four aromatic units, preferably two, three or four aromatic units, in its molecular structure.

Non-Polymeric Phenolic Compound

The non-polymeric phenolic compound is a low molecular weight compound having phenolic hydroxyl groups (i.e. hydroxyl groups bound to an aromatic moiety). Some of the non-polymeric phenolic compounds may be regarded as a condensation product of a phenol component and formaldehyde. However, the compounds do not represent polymers, but low molecular weight compounds.

The non-polymeric phenolic compound comprises at least two and not more than four aromatic units, preferably two, three or four aromatic units, in its molecular structure. It is preferred that at least two of the aromatic units in the non-polymeric phenolic compound have in each case at least one hydroxyl group directly attached thereto.

It is further preferred that the aromatic units are six-membered aromatic ring systems, which may be substituted or unsubstituted. It is more preferred that the aromatic units are phenyl systems, which may be substituted or unsubstituted. Preferred substituents for said aromatic units are selected from hydroxyl, alkyl, phenyl and fluorine groups. If a phenyl group is present as a substituent on an aromatic unit, the phenyl group likewise represents a further independent aromatic unit. In any case, it needs to be ensured that the total number of aromatic units in the non-polymeric phenolic compound does not exceed four.

It is preferred that the non-polymeric phenolic compound has a molecular weight in the range from 180 to 1,000 g/mol, preferably from 220 to 750 g/mol, more preferably from 240 to 600 g/mol, and most preferably from 250 to 480 g/mol.

It is further preferred that the non-polymeric phenolic compound contains 12 to 56 (preferably 12 to 32) carbon atoms, 2 to 8 (preferably 2 to 6) oxygen atoms and 10 to 32 hydrogen atoms.

In a preferred embodiment of the present invention, the non-polymeric phenolic compound is represented by one of the following Formulae (I), (II) and (III):

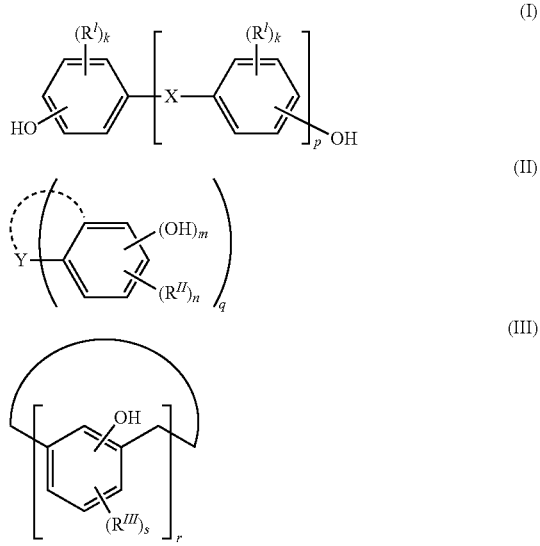

wherein in Formula (I): X represents —CO—, —SO$_2$—, —O— or a linear or branched alkylene group having 1 to 5 carbon atoms, which may be fluorinated, wherein the alkylene group is preferably selected from —CH$_2$—, —CF$_2$—, —CH(CH$_3$)—, —CF(CF$_3$)—, —C(CH$_3$)$_2$—, —C(CF$_3$)$_2$—, —C(CH$_3$)(CH$_2$CH$_3$)—, —C(CF$_3$)(CF$_2$CF$_3$)—, —C(CH$_2$CH$_3$)$_2$— or —C(CF$_2$CF$_3$)$_2$—, or X is absent; $R^I$ represents at each occurrence independently from each other hydroxyl, alkyl having 1 to 5 carbon atoms, preferably methyl, ethyl, propyl, butyl or pentyl, or phenyl; k is an integer from 0 to 4, preferably 0, 1 or 2; and p is an integer from 1 to 3, preferably 1, 2 or 3, more preferably 1 or 2;

wherein in Formula (II): Y represents a saturated or unsaturated hydrocarbyl moiety, which may be fluorinated and/or may contain one or more hydroxyl groups, wherein Y may be linked to one or more of the adjacent aromatic units independently from each other via a second bond

to form a bi- or multicyclic system; $R^{II}$ represents at each occurrence independently from each other hydroxyl, alkyl having 1 to 5 carbon atoms, preferably methyl, ethyl, propyl, butyl or pentyl, or phenyl; m is at each occurrence independently from each other an integer from 1 to 5, preferably 1, 2 or 3; n is at each occurrence independently from each other an integer from 0 to 4, preferably 0, 1 or 2; and q is an integer from 2 to 4, preferably 2, 3 or 4; and wherein in Formula (III): $R^{III}$ represents at each occurrence independently from each other alkyl having 1 to 5 carbon atoms, preferably methyl, ethyl, propyl, butyl or pentyl; s is an integer from 0 to 3, preferably 0, 1, 2 or 3; and r is 3 or 4, preferably 4.

The hydrocarbyl moiety in Formula (II) forms the central part (backbone) of the non-polymeric phenolic compound around which q of the individual substituted aromatic units, which are shown in parentheses ( ), are arranged. The hydrocarbyl moiety is composed of carbon and hydrogen atoms and may be substituted with one or more fluorine atoms and/or hydroxyl groups. In this case, there is then a fluorinated and/or hydroxylated hydrocarbyl moiety. The hydrocarbyl moiety may have a linear, branched, cyclic and/or polycyclic structure. The hydrocarbyl moiety may be saturated or unsaturated. In addition to C—C single bonds, unsaturated hydrocarbyl moieties may contain one or more C=C double bonds and/or one or more C≡C triple bonds. The C=C double bonds may be isolated, conjugated and/or cumulated. The C≡C triple bonds may be isolated and/or conjugated. If the hydrocarbyl moiety contains a plurality of C=C double bonds which together form one or more aromatic units within the hydrocarbyl moiety, these aromatic units are taken into account for the total number or aromatic units to be present in the non-polymeric phenolic compound and the upper limit of q is reduced, correspondingly, so that the total number of aromatic units in the molecular structure of the non-polymeric phenolic compound does not exceed the maximum number.

The compounds according to Formula (III) are cyclic compounds containing 3 or 4 repeating units shown in parentheses. The cyclic structure of the compounds is illustrated by

In a more preferred embodiment of the present invention, the non-polymeric phenolic compound of Formula (I) is represented by Formula (I-A) or (I-B):

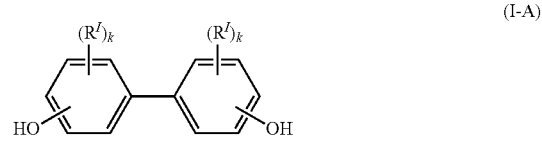

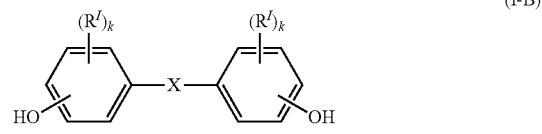

wherein X represents —CO—, —SO$_2$—, —O—, or a linear or branched alkylene group having 1 to 5 carbon atoms, which may be fluorinated, wherein the alkylene group is preferably selected from —CH$_2$—, —CF$_2$—, —CH(CH$_3$)—, —CF(CF$_3$)—, —C(CH$_3$)$_2$—, —C(CF$_3$)$_2$—, —C(CH$_3$)(CH$_2$CH$_3$)—, —C(CF$_3$)(CF$_2$CF$_3$)—, —C(CH$_2$CH$_3$)$_2$— and —C(CF$_2$CF$_3$)$_2$—; $R^I$ represents at each occurrence independently from each other hydroxyl, alkyl having 1 to 5 carbon atoms, preferably methyl, ethyl, propyl, butyl or pentyl, or phenyl; and k is an integer from 0 to 4, preferably 0, 1 or 2.

In a more preferred embodiment of the present invention, the non-polymeric phenolic compound of Formula (II) is represented by Formula (II-A), (II-B), (II-C), (II-D), (II-E), (II-F) or (II-G):

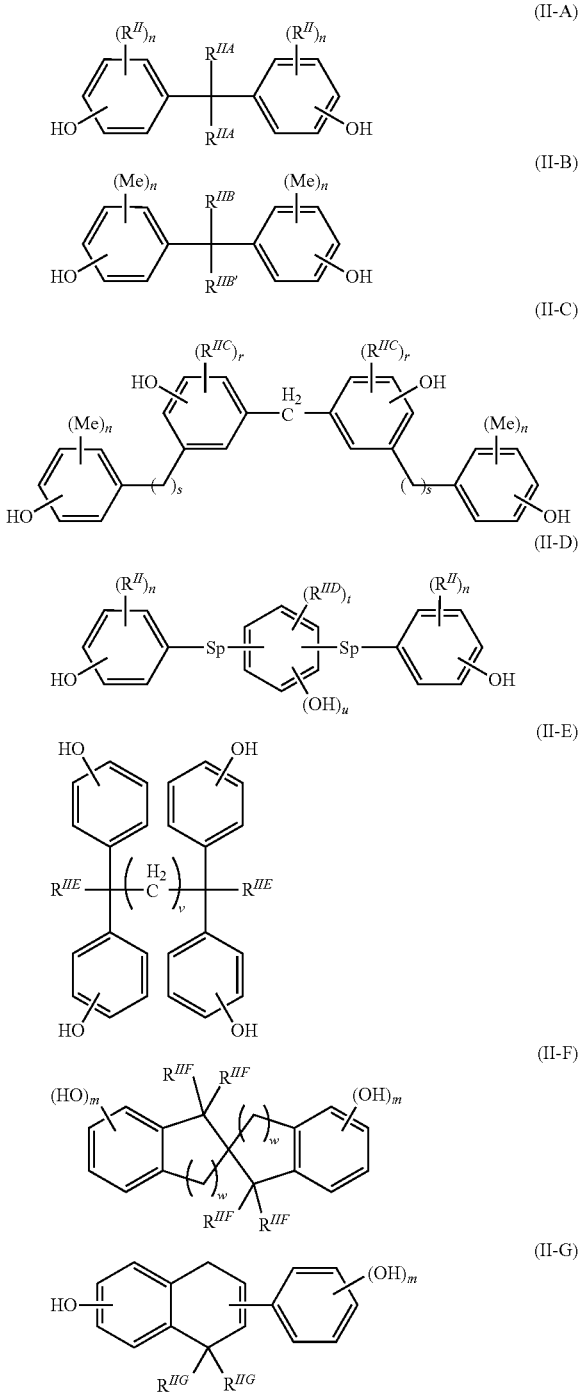

(II-A)
(II-B)
(II-C)
(II-D)
(II-E)
(II-F)
(II-G)

wherein in Formula (II-A): $R^{II}$=Me or Ph, preferably Ph; $R^{IIA}$=Ph, —$C_6H_4$—OH, —$CH_2$—$C_6H_4$—OH or —$CH_2CH_2$—$C_6H_4$—OH; or both $R^{IIA}$ together form a fluorenylene group or cyclohexylene group, which may be substituted with —OH or —$C_6H_4$—OH; and n=0 or 1;

wherein in Formula (II-B): $R^{IIB}$=H or Me; $R^{IIB'}$=-Ph, —$C_6H_4$—OH or —$C_6H_4$—$C(CH_3)_2$—$C_6H_4$—OH; and n=0 or 1;

wherein in Formula (II-C): $R^{IIC}$ represents alkyl having 1 to 3 carbon atoms, preferably methyl, ethyl or propyl; n=0 or 1; r=0, 1 or 2; and s=0, 1, 2 or 3;

wherein in Formula (II-D): $R^{II}$=Me or Ph, preferably Me; $R^{IID}$ represents alkyl having 1 to 3 carbon atoms, preferably methyl, ethyl or propyl; Sp represents a linear or branched alkylene group having 1 to 5 carbon atoms, preferably —$CH_2$—, —$C(CH_3)_2$—, —$CH_2$—$CH_2$— or —$CH_2$—$CH_2$—$CH_2$—; n=0 or 1; t=0 or 1; and u=0 or 1;

wherein in Formula (II-E): $R^{IIE}$=H or Me; and v=0, 1, 2 or 3;

wherein in Formula (II-F): $R^{IIF}$=H or Me; and m=1, 2 or 3; and wherein in Formula (II-G): $R^{IIG}$=H or Me; and m=1, 2 or 3.

In a more preferred embodiment of the present invention, the non-polymeric phenolic compound of Formula (III) is represented by Formula (III-A) or (III-B):

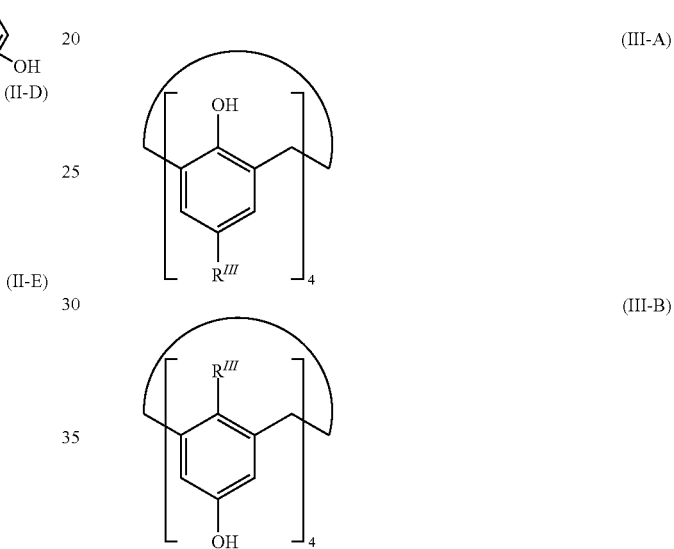

(III-A)
(III-B)

wherein $R^{III}$ represents at each occurrence independently from each other alkyl having 1 to 5 carbon atoms, preferably methyl, ethyl, propyl, butyl or pentyl.

In a most preferred embodiment of the present invention, the non-polymeric phenolic compound is selected from:

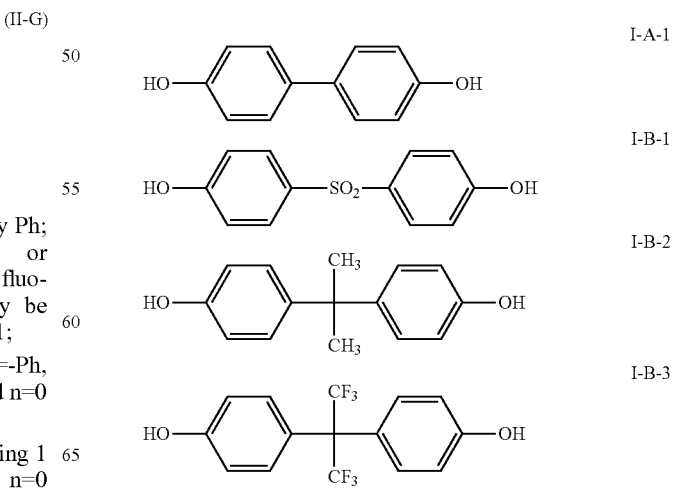

I-A-1
I-B-1
I-B-2
I-B-3

I-B-4
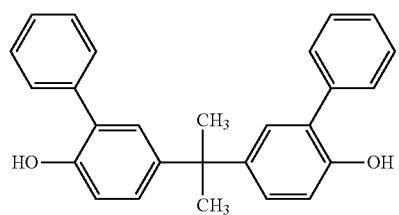
II-A-1
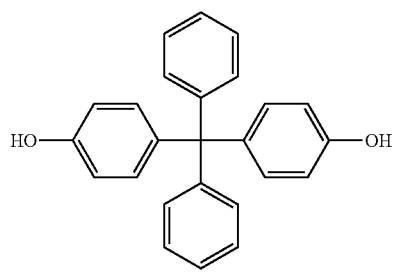
II-A-2
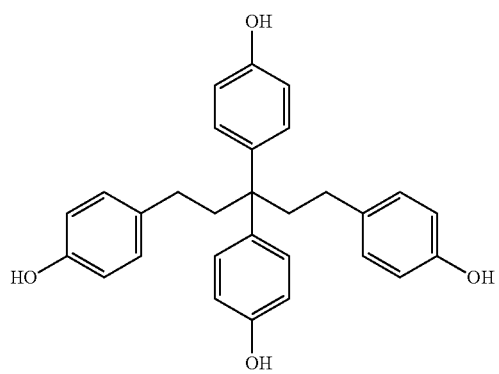
II-A-3
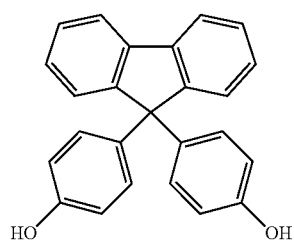
II-A-4
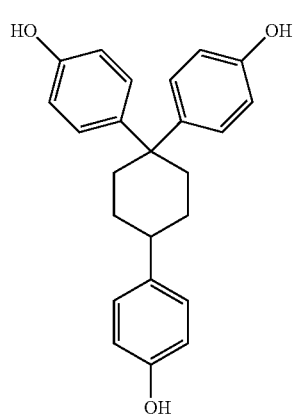
II-B-1
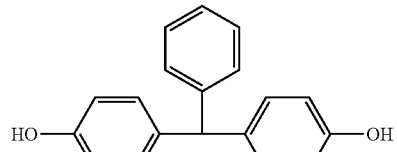
II-B-2
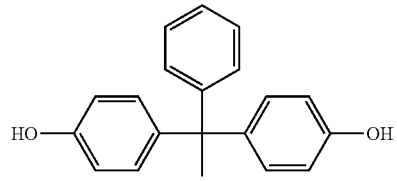
II-B-3
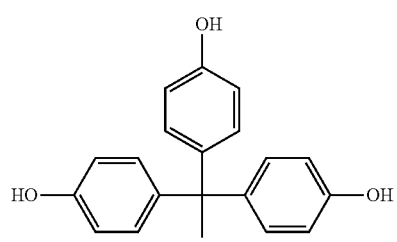
II-B-4
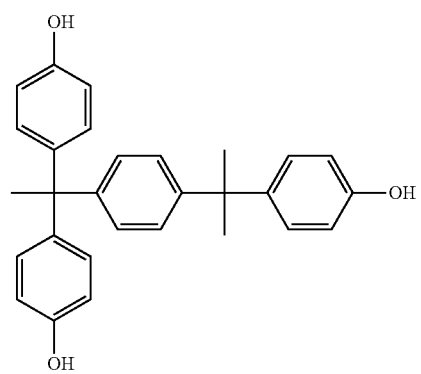
II-C-1
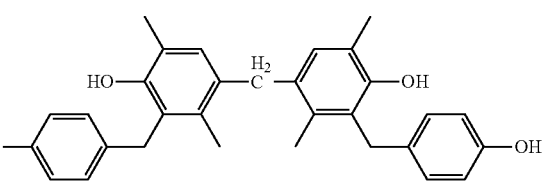
II-D-1
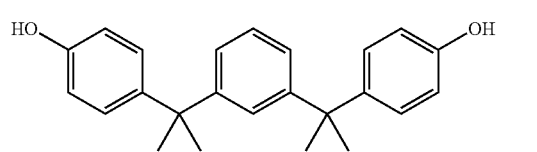
II-D-2
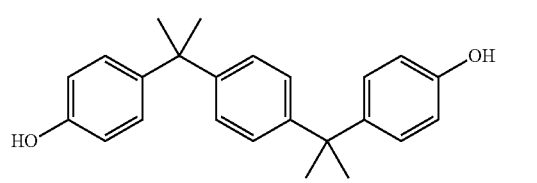

II-D-3
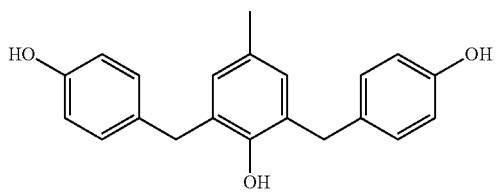

II-D-4
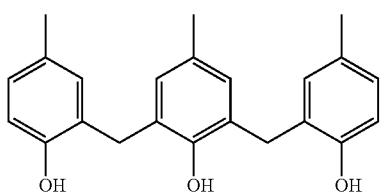

II-E-1
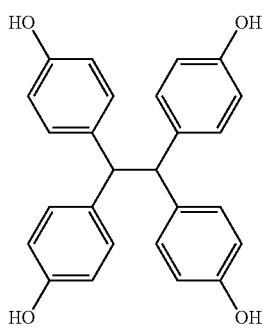

II-E-2
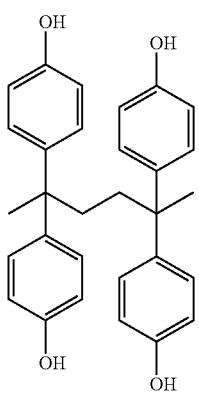

II-F-1
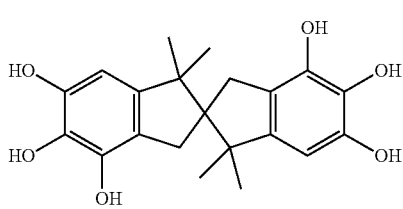

II-G-1
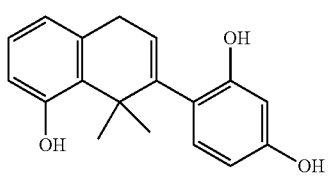

III-A-1
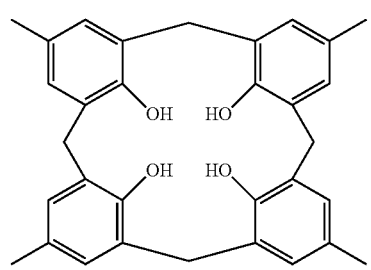

III-A-2
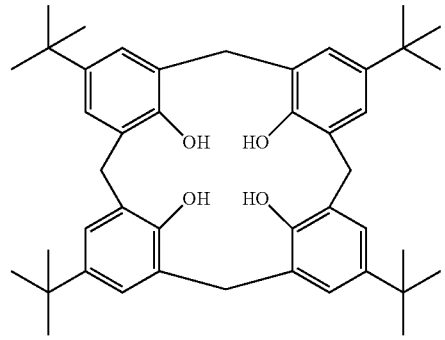

Preferably, the total content of the non-polymeric phenolic compound in the coating composition is in the range from 10 to 90 weight-%, preferably from 15 to 75 weight-%, based on the total weight of silazane-containing polymer in the coating composition.

Silazane-Containing Polymer

In a preferred embodiment, the silazane-containing polymer comprises a repeating unit $M^1$ which is represented by the following Formula (1):

$$—[SiR^1R^2—NR^3—]$$  (1)

wherein $R^1$, $R^2$ and $R^3$ are the same or different from each other and independently selected from hydrogen, an organic group, a heteroorganic group, or a combination thereof.

Suitable organic and heteroorganic groups for $R^1$, $R^2$ and $R^3$ include alkyl, alkylcarbonyl, alkenyl, cycloalkyl, aryl, arylalkyl, alkylsilyl, alkylsilyloxy, arylsilyl, arylsilyloxy, alkylamino, arylamino, alkoxy, alkoxycarbonyl, alkylcarbonyloxy, aryloxy, aryloxycarbonyl, arylcarbonyloxy, arylalkyloxy, and the like, and combinations thereof (preferably, alkyl, alkenyl, cycloalkyl, aryl, arylalkyl, alkoxy, aryloxy, arylalkyloxy, and combinations thereof); the groups preferably having from 1 to 30 carbon atoms (more preferably, 1 to 20 carbon atoms; even more preferably, 1 to 10 carbon atoms; most preferably, 1 to 6 carbon atoms (for example, methyl, ethyl or vinyl)). The groups can be further substituted with one or more substituent groups such as halogen (fluorine, chlorine, bromine, and iodine), alkoxy, alkoxycarbonyl, amino, carboxyl, hydroxyl, nitro, and the like, and combinations thereof.

In a preferred embodiment, $R^1$ and $R^2$ are the same or different from each other and independently selected from hydrogen, alkyl having 1 to 30 (preferably 1 to 20, more preferably 1 to 10, most preferably 1 to 6) carbon atoms, alkenyl having 2 to 30 (preferably 2 to 20, more preferably 2 to 10, most preferably 2 to 6) carbon atoms, or aryl having 2 to 30 (preferably 3 to 20, more preferably 4 to 10, most preferably 6) carbon atoms, wherein one or more hydrogen atoms bonded to carbon atoms may be replaced by fluorine; and $R^3$ is selected from hydrogen, alkyl having 1 to 30 (preferably 1 to 20, more preferably 1 to 10, most preferably 1 to 6) carbon atoms, alkenyl having 2 to 30 (preferably 2 to 20, more preferably 2 to 10, most preferably 2 to 6) carbon atoms, or aryl having 2 to 30 (preferably 3 to 20, more preferably 4 to 10, most preferably 6) carbon atoms, wherein one or more hydrogen atoms bonded to carbon atoms may be replaced by fluorine or OR', wherein R' is selected from alkyl having 1 to 30 (preferably 1 to 20, more preferably 1 to 10, most preferably 1 to 6) carbon atoms.

In a more preferred embodiment, $R^1$ and $R^2$ are the same or different from each other and independently selected from hydrogen, methyl, ethyl, propyl, butyl, pentyl, hexyl or phenyl, wherein one or more hydrogen atoms bonded to carbon atoms may be replaced by fluorine; and $R^3$ is selected from hydrogen, methyl, ethyl, propyl, butyl, pentyl, hexyl, vinyl or phenyl, wherein one or more hydrogen atoms bonded to carbon atoms may be replaced by —F, —OCH$_3$, —OCH$_2$CH$_3$, —OCH$_2$CH$_2$CH$_3$, or —OCH(CH$_3$)$_2$.

Most preferably, $R^1$, $R^2$ and $R^3$ are the same or different from each other and independently selected from the list consisting of —H, —CH$_3$, —CH$_2$CH$_3$, —CH$_2$CH$_2$CH$_3$, —CH(CH$_3$)$_2$, —CH=CH$_2$, and —C$_6$H$_5$, wherein one or more hydrogen atoms bonded to carbon atoms may be replaced by fluorine.

In a preferred embodiment, the silazane-containing polymer comprises a repeating unit $M^2$ which is represented by the following Formula (2):

$$—[SiR^4R^5—NR^6—] \quad (2)$$

wherein $R^4$, $R^5$ and $R^6$ are the same or different from each other and independently selected from hydrogen, an organic group, a heteroorganic group, or a combination thereof.

Suitable organic and heteroorganic groups for $R^4$, $R^5$ and $R^6$ include alkyl, alkylcarbonyl, alkenyl, cycloalkyl, aryl, arylalkyl, alkylsilyl, alkylsilyloxy, arylsilyl, arylsilyloxy, alkylamino, arylamino, alkoxy, alkoxycarbonyl, alkylcarbonyloxy, aryloxy, aryloxycarbonyl, arylcarbonyloxy, arylalkyloxy, and the like, and combinations thereof (preferably, alkyl, alkenyl, cycloalkyl, aryl, arylalkyl, alkoxy, aryloxy, arylalkyloxy, and combinations thereof); the groups preferably having from 1 to 30 carbon atoms (more preferably, 1 to 20 carbon atoms; even more preferably, 1 to 10 carbon atoms; most preferably, 1 to 6 carbon atoms (for example, methyl, ethyl or vinyl)). The groups can be further substituted with one or more substituent groups such as halogen (fluorine, chlorine, bromine, and iodine), alkoxy, alkoxycarbonyl, amino, carboxyl, hydroxyl, nitro, and the like, and combinations thereof.

In a preferred embodiment, $R^4$ and $R^5$ are the same or different from each other and independently selected from hydrogen, alkyl having 1 to 30 (preferably 1 to 20, more preferably 1 to 10, most preferably 1 to 6) carbon atoms, alkenyl having 2 to 30 (preferably 2 to 20, more preferably 2 to 10, most preferably 2 to 6) carbon atoms, or aryl having 2 to 30 (preferably 3 to 20, more preferably 4 to 10, most preferably 6) carbon atoms, wherein one or more hydrogen atoms bonded to carbon atoms may be replaced by fluorine; and $R^6$ is selected from hydrogen, alkyl having 1 to 30 (preferably 1 to 20, more preferably 1 to 10, most preferably 1 to 6) carbon atoms, alkenyl having 2 to 30 (preferably 2 to 20, more preferably 2 to 10, most preferably 2 to 6) carbon atoms, or aryl having 2 to 30 (preferably 3 to 20, more preferably 4 to 10, most preferably 6) carbon atoms, wherein one or more hydrogen atoms bonded to carbon atoms may be replaced by fluorine or OR'', wherein R'' is selected from alkyl having 1 to 30 (preferably 1 to 20, more preferably 1 to 10, most preferably 1 to 6) carbon atoms.

In a more preferred embodiment, $R^4$ and $R^5$ are the same or different from each other and independently selected from hydrogen, methyl, ethyl, propyl, butyl, pentyl, hexyl or phenyl, wherein one or more hydrogen atoms bonded to carbon atoms may be replaced by fluorine; and $R^6$ is selected from hydrogen, methyl, ethyl, propyl, butyl, pentyl, hexyl, vinyl or phenyl, wherein one or more hydrogen atoms bonded to carbon atoms may be replaced by —F, —OCH$_3$, —OCH$_2$CH$_3$, —OCH$_2$CH$_2$CH$_3$, or —OCH(CH$_3$)$_2$.

Most preferably, $R^4$, $R^5$ and $R^6$ are the same or different from each other and independently selected from the list consisting of —H, —CH$_3$, —CH$_2$CH$_3$, —CH$_2$CH$_2$CH$_3$, —CH(CH$_3$)$_2$, —CH=CH$_2$, and —C$_6$H$_5$, wherein one or more hydrogen atoms bonded to carbon atoms may be replaced by fluorine.

In a preferred embodiment, the silazane-containing polymer comprises a repeating unit $M^3$ which is represented by the following Formula (3):

$$—[SiR^7R^8—O—] \quad (3)$$

wherein $R^7$ and $R^8$ are the same or different from each other and independently selected from hydrogen, an organic group, a heteroorganic group, or a combination thereof.

Suitable organic and heteroorganic groups for $R^7$ and $R^8$ include alkyl, alkylcarbonyl, alkenyl, cycloalkyl, aryl, arylalkyl, alkylsilyl, alkylsilyloxy, arylsilyl, arylsilyloxy, alkylamino, arylamino, alkoxy, alkoxycarbonyl, alkylcarbonyloxy, aryloxy, aryloxycarbonyl, arylcarbonyloxy, arylalkyloxy, and the like, and combinations thereof (preferably, alkyl, alkenyl, cycloalkyl, aryl, arylalkyl, alkoxy, aryloxy, arylalkyloxy, and combinations thereof); the groups preferably having from 1 to 30 carbon atoms (more preferably, 1 to 20 carbon atoms; even more preferably, 1 to 10 carbon atoms; most preferably, 1 to 6 carbon atoms (for example, methyl, ethyl or vinyl)). The groups can be further substituted with one or more substituent groups such as halogen (fluorine, chlorine, bromine, and iodine), alkoxy, alkoxycarbonyl, amino, carboxyl, hydroxyl, nitro, and the like, and combinations thereof.

In a preferred embodiment, $R^7$ and $R^8$ are the same or different from each other and independently selected from hydrogen, alkyl having 1 to 30 (preferably 1 to 20, more preferably 1 to 10, most preferably 1 to 6) carbon atoms, alkenyl having 2 to 30 (preferably 2 to 20, more preferably 2 to 10, most preferably 2 to 6) carbon atoms, or aryl having 2 to 30 (preferably 3 to 20, more preferably 4 to 10, most preferably 6) carbon atoms, wherein one or more hydrogen atoms bonded to carbon atoms may be replaced by fluorine.

In a more preferred embodiment, $R^7$ and $R^8$ are the same or different from each other and independently selected from hydrogen, methyl, ethyl, propyl, butyl, pentyl, hexyl or phenyl, wherein one or more hydrogen atoms bonded to carbon atoms may be replaced by fluorine.

Most preferably, $R^7$ and $R^8$ are the same or different from each other and independently selected from the list consisting of —H, —CH$_3$, —CH$_2$CH$_3$, —CH$_2$CH$_2$CH$_3$, —CH(CH$_3$)$_2$, —CH=CH$_2$, and —C$_6$H$_5$, wherein one or more hydrogen atoms bonded to carbon atoms may be replaced by fluorine.

It is preferred that the silazane-containing polymer comprises a repeating unit $M^1$ and a further repeating unit $M^2$, wherein $M^1$ and $M^2$ are silazane repeating units which are different from each other.

It is also preferred that the silazane-containing polymer comprises a repeating unit $M^1$ and a further repeating unit $M^3$, wherein $M^1$ is a silazane repeating unit and $M^3$ is a siloxane repeating unit.

It is also preferred that the silazane-containing polymer comprises a repeating unit $M^1$, a further repeating unit $M^2$ and a further repeating unit $M^3$, wherein $M^1$ and $M^2$ are silazane repeating units which are different from each other and $M^3$ is a siloxane repeating unit.

In one embodiment, the silazane-containing polymer is a polysilazane which may be a perhydropolysilazane or an organopolysilazane. Preferably, the polysilazane contains a repeating unit $M^1$ and optionally a further repeating unit $M^2$, wherein $M^1$ and $M^2$ are silazane repeating units which are different from each other.

In an alternative embodiment, the silazane-containing polymer is a polysiloxazane which may be a perhydropolysiloxazane or an organopolysiloxazane. Preferably, the polysiloxazane contains a repeating unit $M^1$ and a further repeating unit $M^3$, wherein $M^1$ is a silazane repeating unit and $M^3$ is a siloxane repeating unit. Preferably, the polysiloxazane contains a repeating unit $M^1$, a further repeating unit $M^2$ and a further repeating unit $M^3$, wherein $M^1$ and $M^2$ are silazane repeating units which are different from each other and $M^3$ is a siloxane repeating unit.

Preferably, the silazane-containing polymer is a copolymer such as a random copolymer or a block copolymer or a copolymer containing at least one random sequence section and at least one block sequence section. More preferably, the silazane-containing polymer is a random copolymer or a block copolymer.

It is preferred that the silazane-containing polymers used in the present invention do not have a monocyclic structure. More preferably, the silazane-containing polymers have a mixed polycyclic, linear and/or branched-chain structure.

The silazane-containing polymers have a molecular weight distribution. Preferably, the silazane-containing polymers used in the present invention have a mass average molecular weight $M_w$, as determined by GPC, of at least 1,000 g/mol, more preferably of at least 1,200 g/mol, even more preferably of at least 1,500 g/mol. Preferably, the mass average molecular weight $M_w$ of the silazane-containing polymers is less than 100,000 g/mol. More preferably, the molecular weight $M_w$ of the silazane-containing polymers is in the range from 1,500 to 50,000 g/mol.

Preferably, the total content of the silazane-containing polymer in the coating composition is in the range from 10 to 90 weight-%, preferably from 25 to 85 weight-%, based on the total weight of the coating composition.

Further Components

It is preferred that the coating composition of the present invention comprises one or more solvents. Suitable solvents are organic solvents such as, for example, aliphatic and/or aromatic hydrocarbons, which may be halogenated, such as 1-chloro-4-(trifluoromethyl)benzene, esters such as ethyl acetate, n-butyl acetate or tert-butyl acetate, ketones such as acetone or methyl ethyl ketone, ethers such as tetrahydrofuran or dibutyl ether, and also mono- or polyalkylene glycol dialkyl ethers (glymes), or mixtures thereof.

Moreover, the coating composition according to the present invention may comprise one or more additives, preferably selected from the list consisting of additives influencing evaporation behavior, additives influencing film formation, adhesion promoters, anti-corrosion additives, cross-linking agents, dispersants, fillers, functional pigments (e.g. for providing functional effects such as electric or thermal conductivity, magnetic properties, etc.), nanoparticles, optical pigments (e.g. for providing optical effects such as color, refractive index, pearlescent effect, etc.), particles reducing thermal expansion, primers, rheological modifiers (e.g. thickeners), surfactants (e.g. wetting and leveling agents or additives for improving hydro- or oleophobicity and anti-graffiti effects), viscosity modifiers, and other kinds of resins or polymers.

Nanoparticles may be selected from nitrides, titanates, diamond, oxides, sulfides, sulfites, sulfates, silicates and carbides which may be optionally surface-modified with a capping agent. Preferably, nanoparticles are materials having a particle diameter of <100 nm, more preferably <80 nm, even more preferably <60 nm, even more preferably <40 nm, and most preferably <20 nm. The particle diameter may be determined by any standard method known to the skilled person.

It is possible to accelerate the curing of the coating composition by the addition of one or more catalysts. Examples of useful catalysts are Lewis acids such as boron-, aluminum-, tin- or zinc-alkyls, aryls or carboxylates, Brönsted acids such as carboxylic acids, bases such as primary, secondary or tertiary amines or phosphazenes, or metal salts such as Pd, Pt, Al, B, Sn or Zn salts of carboxylates, acetylacetonates or alkoxylates. If Silazanes having both Si—H and Si—CH=$CH_2$ groups are used, well known hydrosilylation catalysts such as Pt or Pd salts or complexes can be used. If Silazanes having only Si—CH=$CH_2$ or both Si—H and Si—CH=$CH_2$ groups are used, UV or thermal radical initiators like peroxides or azo compounds can be used. In a preferred embodiment, the coating composition according to the present invention comprises one or more of the above-mentioned catalysts.

It is preferred that the mass ratio between the silazane-containing polymer and the non-polymeric phenolic compound in the coating composition of the present invention is in the range from 1:100 to 100:1, preferably from 1:50 to 50:1, more preferably from 1:10 to 10:1, even more preferably from 1:8 to 8:1, and most preferably from 1:3 to 6:1.

It is to be understood that the skilled person can freely combine the above-mentioned preferred, more preferred, particularly preferred and most preferred embodiments relating to the coating composition and definitions of its components in any desired way.

Method

The present invention further relates to a method for preparing a coated article, wherein the method comprises the following steps:

(a) applying a coating composition according to the present invention to a surface of an article; and
(b) curing said coating composition to obtain a coated article.

In a preferred embodiment, the coating composition, which is applied in step (a), is previously provided by mixing a first component comprising a silazane-containing polymer with a second component comprising a non-polymeric phenolic compound, wherein the silazane-containing polymer and the non-polymeric phenolic compound are defined as indicated above for the coating composition according to the present invention. It is preferred that the mixing of the first component with the second component takes place at an elevated temperature, preferably at a temperature between 60 and 150° C., more preferably at a temperature between 80 and 140° C. and most preferably at a temperature between 100 and 130° C.

Preferably, the coating composition, which is applied in step (a), is a homogeneous liquid having a viscosity in the range from 2 to 1,000 mPas. The viscosity of the composition may be adjusted by the type and content of solvent as well as the type, ratio and molecular weight of the silazane-containing polymer and non-polymeric phenolic compound.

It is preferred that the coating composition is applied in step (a) by an application method suitable for applying liquid compositions to a surface of an article. Such methods include, for example, wiping with a cloth, wiping with a sponge, dip coating, spray coating, flow coating, roller coating, slit coating, slot coating, spin coating, dispensing, screen printing, stencil printing or ink-jet printing. Dip coating and spray coating are particularly preferred.

The coating composition of the invention may be applied to the surface of various articles such as, for example, buildings, dentures, furnishings, furniture, sanitary equipment (toilets, sinks, bathtubs, etc.), signs, signboard, plastic products, glass products, ceramics products, metal products, wood products and vehicles (road vehicles, rail vehicles, watercrafts and aircrafts). It is preferred that the surface of the article is made of any one of the base materials as described for the use below.

Typically, the coating composition is applied in step (a) as a layer in a thickness of 1 μm to 1 cm, preferably 10 μm to 1 mm, to the surface of the article. In a preferred embodiment, the coating composition is applied as a thin layer having a thickness of 1 to 200 μm, more preferably 5 to 150 μm and most preferably 10 to 100 μm. In an alternative preferred embodiment, the coating composition is applied as a thick layer having a thickness of 200 μm to 1 cm, more preferably 200 μm to 5 mm and most preferably 200 μm to 1 mm.

The curing of the coating in step (b) may be carried out under various conditions such as e.g. by ambient curing, thermal curing and/or irradiation curing. The curing is optionally carried out in the presence of moisture, preferably in the form of water vapor. For this purpose, a climate chamber may be used.

Ambient curing preferably takes place at temperatures in the range from 10 to 40° C. Thermal curing preferably takes place at temperatures in the range from 100 to 200° C., preferably from 120 to 180° C. Irradiation curing preferably takes place with IR irradiation or UV irradiation. Preferred IR irradiation wavelengths are in the range from 7 to 15 μm or from 1 to 3 μm for substrate absorption. Preferred UV irradiation wavelengths are in the range from 200 to 300 nm (short wavelength range).

Preferably, the curing in step (b) is carried out in a furnace or climate chamber. Alternatively, if articles of very large size are coated (e.g. buildings, vehicles, etc.), the curing is preferably carried out under ambient conditions.

Preferably, the curing time for step (b) is from 0.01 to 24 h, more preferably from 0.10 to 16 h, still more preferably from 0.15 to 8 h, and most preferably from 0.20 to 5 h, depending on the coating composition and coating thickness.

After curing in step (b), the silazane-containing polymer and the non-polymeric phenolic compound are chemically linked to form a coating on the surface of the article.

The coating obtained by the above method forms a rigid and dense functional coating which is excellent in adhesion to the surface and imparts at least one of the following improved properties to the article: improved mechanical resistance and durability (including improved surface hardness, improved scratch resistance and/or improved abrasion resistance); improved wetting and adhesion properties (including hydro- and oleophobicity, easy-to-clean effect and/or anti-graffiti effect); improved chemical resistance (including improved corrosion resistance (e.g. against solvents, acidic and alkaline media and corrosive gases) and/or improved anti-oxidation effect); improved optical effects (improved light fastness); and improved physical barrier or sealing effects.

Article

Moreover, a coated article is provided, which is obtainable or obtained by the above-mentioned preparation method.

Use

The present invention further relates to the use of the coating composition according to the present invention for forming a functional coating on the surface of a base material.

It is preferred that by the use according to the present invention one or more of the following surface properties is improved: mechanical resistance and durability (including surface hardness, scratch resistance and/or abrasion resistance); wetting and adhesion properties (including hydro- and oleophobicity, easy-to-clean effect and/or anti-graffiti effect); chemical resistance (including corrosion resistance (e.g. against solvents, acidic and alkaline media and corrosive gases) and/or anti-oxidation effect); optical effects (light fastness); and physical barrier or sealing effects.

Preferred base materials, to which the coating composition according to the present invention is applied, include a wide variety of materials such as, for example, metals (such as iron, steel, silver, zinc, aluminum, nickel, titanium, vanadium, chromium, cobalt, copper, zirconium, niobium, molybdenum, ruthenium, rhodium, silicon, boron, tin, lead or manganese or alloys thereof provided, if necessary, with an oxide or plating film); plastics (such as polymethyl methacrylate (PMMA), polyurethane, polyesters (PET), polyallyldiglycol carbonate (PADC), polycarbonate, polyimide, polyamide, epoxy resin, ABS resin, polyvinyl chloride, polyethylene (PE), polypropylene (PP), polythiocyanate, or polytetrafluoroethylene (PTFE)); glass (such as fused quartz, soda-lime-silica glass (window glass), sodium borosilicate glass (Pyrex®), lead oxide glass (crystal glass), aluminosilicate glass, or germanium-oxide glass); and construction materials (such as brick, cement, ceramics, clay, concrete, gypsum, marble, mineral wool, mortar, stone, or wood and mixtures thereof).

The base materials may be treated with a primer to enhance the adhesion of the functional coating. Such primers are, for instance, silanes, siloxanes, or silazanes. If plastic materials are used, it may be advantageous to perform a pretreatment by flaming, corona or plasma treatment which might improve the adhesion of the functional coating. If construction materials are used, it may be advantageous to perform a precoating with lacquers, varnishes or paints such as, for example, polyurethane lacquers, acrylic lacquers and/or dispersion paints.

The present invention is further illustrated by the examples following hereinafter which shall in no way be construed as limiting. The skilled person will acknowledge that various modifications, additions and alternations may be made to the invention without departing from the spirit and scope of the present invention.

Examples

In the examples, the Bisphenols AF and S (available from Sigma-Aldrich Chemie GmbH, Germany) are reacted with Durazane 1033 and Durazane 1800 (available from MERCK KGaA, Germany).

Preparation of Coating Compositions 100 g silazane are dissolved in 400 g mesitylene and heated under nitrogen atmosphere to 120° C. Then 25 g of the solid bisphenol are added in 5 portions of 5 g each in time intervals of 90 min (see Table 1). After each addition it takes about 60 min until the solid bisphenol is completely dissolved. After the last addition the reaction mixture is heated to 140° C. for 3 h. Then the solution is cooled down to room temperature, filtrated over a 1 μm PTFE filter and evaporated under reduced pressure at 60° C. to final mass of 250 g. The result is a slightly viscous, clear, colorless to slightly yellow solution.

TABLE 1

Preparation of coating compositions

| Composition | Silazane | Bisphenol |
|---|---|---|
| 1 | Durazane 1033 | Bisphenol AF |
| 2 | Durazane 1800 | Bisphenol S |

To demonstrate the performance of the prepared compositions as coatings, the compositions were applied on different substrates and subjected to different tests.

Coating on silicon wafers was performed by spin coating with film thickness of 5-6 μm for Application Tests 1 and 2.

Coating on silicon wafers was performed by spin coating with film thickness adjustment by controlled spinning speed (rpm) and solvent content (viscosity) of: 5-6 μm, 8-10 μm, 18-20 μm, 40-50 μm and 70-80 μm for Application Test 3.

Coating on steel panels (available from Q-Panel) was performed by dip coating with a film thickness of 20-25 μm for Application Tests 4 and 6.

Coating on aluminum panels (available from Q-Panel) was performed by dip coating with a film thickness of 20-25 μm for Application Test 5.

Application Test 1
Curing Time at Ambient Conditions of 25° C. and 50% Relative Humidity.

After coating, the wafers were stored in controlled atmosphere of 25° C. and a relative humidity of 50%. After 15 min and subsequently in time periods of 15 min the surface of the coating was checked for stickiness. The first time, when the surface was not sticky anymore, was defined as the minimum dry-to-touch time (see Table 2).

TABLE 2

Application Test 1

| Material | Dry-to-touch time @ 25° C. and 50% relative humidity |
|---|---|
| Composition 1 | 45 min |
| Composition 2 | 45 min |
| Reference: Durazane 1033 | >24 h |
| Reference: Durazane 1800 | >24 h |
| Composition 1 + 0.5% Al(AcAc)$_3$ | 30 min |
| Composition 1 + 0.5% DBU* | 30 min |
| Reference: Durazane 1033 + 0.5% Al(AcAc)$_3$ | 120 min |
| Reference: Durazane 1033 + 0.5% DBU* | 120 min |

*DBU = 1,8-diazabicyclo[5.4.0]undec-7-ene

Application Test 1 demonstrates a very fast dry-to-touch curing of the inventive coating compositions. Quick dry-to-touch curing is very important for some industrial processes, e.g. in coil coating and other processes where a roll-to-roll process is used. Another advantage of fast drying is reduced absorption of air-born dust on the wet coating which results in less surface defects. The addition of well-known curing catalysts may further reduce the dry-to-touch time.

Application Test 2
Film Hardness after Curing at Elevated Temperature of 120° C. for 4 h.

The scratch resistance was analyzed with an "Elcometer 3000 Manual Clement Unit" equipped with a "0.04 inch tungsten carbide ball" pin (available from Elcometer Instruments GmbH, Germany). The test was started with a weight of 200 g and the weight load was increase in steps of 50 g. After scratching the specimen was investigated if a scratch was visible with the naked eye. The highest weight without scratch was noted (see Table 3).

TABLE 3

Application Test 2

| Material | Maximum weight without scratch [g] |
|---|---|
| Composition 1 | 950 |
| Composition 2 | 950 |
| Reference: Durazane 1033 | 500 |
| Reference: Durazane 1800 | 550 |
| Composition 2 + 0.5% Luperox* | 1150 |
| Reference: Durazane 1800 + 0.5% Luperox* | 700 |

*Luperox = Luperox 531M80 (1,1-bis(tert-amylperoxy)cyclohexane)

Application Test 2 demonstrates an improved scratch resistance, hardness and mechanical stability of the coatings obtained from the inventive compositions compared to pure silazane resins. Especially, the combination of a vinyl group containing silazane and a bisphenol with thermal curing and the addition of a radical initiator showed excellent scratch resistance.

Application Test 3
Maximum Film Thickness without Crack Formation.

After spin coating of the materials on silicon wafers in different film thicknesses, the wafers were cured for 4 h@120° C. and then for 4 h@180° C. on a hot plate. After cooling to room temperature the coating was inspected on crack formation with the naked eye (see Table 4).

TABLE 4

Application Test 3

| Material | 5-6 μm* | 8-10 μm* | 18-20 μm* | 40-50 μm* | 70-80 μm* |
|---|---|---|---|---|---|
| Composition 1 | no crack | no crack | no crack | no crack | crack |
| Composition 2 | no crack | no crack | no crack | no crack | no crack |
| Reference: Durazane 1033 | no crack | no crack | crack | — | — |
| Reference: Durazane 1800 | no crack | no crack | crack | — | — |
| Composition 2 + 0.5% Luperox** | no crack | no crack | no crack | no crack | no crack |
| Reference: Durazane 1800 + 0.5% Luperox** | no crack | no crack | no crack | crack | — |

*film thickness in micrometer
*Luperox = Luperox 531M80 (1,1-bis(tert-amylperoxy)cyclohexane)

Application Test 3 demonstrates a high possible film thicknesses achievable with the inventive coating compositions. Pure silazanes cannot form crack-free films with thicknesses of 50 μm or more. However, for some applications, as for example in heavy duty corrosion protection, film thicknesses of >50 μm are common. The new compositions can form crack-free films with film thicknesses of significantly more than 50 μm.

Application Test 4

HCl Resistance of Steel Panels.

After dip coating of the materials on steel substrates, the substrates were cured for 4 h@120° C. and then for 4 h@150° C. on a hot plate. After cooling to room temperature a drop of 10% aqueous HCl or a drop of 37% aqueous HCl was placed on the substrate for 16 h. Then the surface was cleaned with water, dried and the coating was inspected on corrosion or spots with the naked eye (see Table 5).

TABLE 5

Application Test 4

| Material | 10% aqueous HCl | 37% aqueous HCl |
|---|---|---|
| Composition 1 | no spot | no spot |
| Composition 2 | no spot | no spot |
| Reference: Durazane 1800 | severe corrosion | severe corrosion |
| Composition 2 + 0.5% Luperox* | no spot | no spot |
| Reference: Durazane 1800 + 0.5% Luperox* | some corrosion | some corrosion |

*Luperox = Luperox 531M80 (1,1-bis(tert-amylperoxy)cyclohexane)

Application Test 5

NaOH Resistance of Aluminum Panels.

After dip coating of the materials on aluminum substrates, the substrates were cured for 4 h@120° C. and then for 4 h@150° C. on a hot plate. After cooling to room temperature a drop of 2.5% aqueous NaOH or a drop of 5% aqueous NaOH was placed on the substrate for 16 h. Then the surface was cleaned with water, dried and the coating was inspected on corrosion or spots with the naked eye (see Table 6).

TABLE 6

Application Test 5

| Material | 2.5% aqueous NaOH | 5% aqueous NaOH |
|---|---|---|
| Composition 1 | no spot | some corrosion |
| Composition 2 | no spot | some corrosion |
| Reference: Durazane 1800 | some corrosion | severe corrosion |
| Composition 2 + 0.5% Luperox* | no spot | no spot |
| Reference: Durazane 1800 + 0.5% Luperox* | some corrosion | severe corrosion |

*Luperox = Luperox 531M80 (1,1-bis(tert-amylperoxy)cyclohexane)

Application Tests 4 and 5 demonstrate the improved chemical resistance of the coatings obtained from the inventive compositions. Protection of steel, aluminum and other metals against alkaline, acidic or other aggressive conditions is for example important in the architectural and automotive area. Other areas, where protective coatings are needed, are on a variety of sensitive surfaces to prevent corrosion by aggressive environments. Examples are the silver mirror background in LED packages or copper circuits in IC, devices which have to operate under harsh conditions, as for example sensors in the automotive industry.

Application Test 6

Flexibility by Bend Test.

After dip coating of the materials on steel substrates, the substrates were cured for 4 h@120° C. and then for 4 h@150° C. on a hot plate. After cooling to room temperature, the panels were subjected to a bending test with an "Elcometer 1510 Conical Mandrel Bend Tester" (available from Elcometer Instruments GmbH, Germany) with a mandrel diameter from 3.2 to 38.1 mm and a mandrel length of 303 mm. The coatings on the bended substrates were inspected on cracks or delamination with the naked eye (see Table 7).

TABLE 7

Application Test 6

| Material | Result of bending test |
|---|---|
| Composition 1 | no delamination |
| Composition 2 | no delamination |
| Reference: Durazane 1033 | severe delamination |
| Reference: Durazane 1800 | severe delamination |
| Composition 2 + 0.5% Luperox* | no delamination |
| Reference: Durazane 1800 + 0.5% Luperox* | some delamination |

*Luperox = Luperox 531M80 (1,1-bis(tert-amylperoxy)cyclohexane)

Application Test 6 demonstrates the good flexibility of the coatings obtained from the inventive compositions. Good flexibility in combination with high hardness is needed for example in coil-coating.

The invention claimed is:

1. A coating composition, comprising:
    a silazane-containing polymer; and
    a non-polymeric phenolic compound;
        wherein the non-polymeric phenolic compound comprises at least two and not more than four aromatic units in its molecular structure, and
        wherein the silazane-containing polymer comprises a repeating unit $M^1$ represented by Formula (1):

$$—[SiR^1R^2—NR^3—]\qquad(1)$$

wherein
    $R^1$ is alkenyl having 2 to 30 carbon atoms;
    $R^2$ is hydrogen, alkyl having 1 to 30 carbon atoms, or alkenyl having 2 to 30 carbon atoms; and
    $R^3$ is hydrogen, alkyl having 1 to 30 carbon atoms, alkenyl having 2 to 30 carbon atoms, or aryl having 2 to 30 carbon atoms;
wherein the total content of the non-polymeric phenolic compound in the coating composition is in the range from 10 to 90 weight-%, based on the total weight of silazane-containing polymer in the coating composition.

2. The coating composition according to claim 1, wherein at least two of the aromatic units in the non-polymeric phenolic compound have in each case at least one hydroxyl group directly attached thereto.

3. The coating composition according to claim 1, wherein the non-polymeric phenolic compound has a molecular weight in the range from 180 to 1,000 g/mol.

4. The coating composition according to claim 1, wherein the non-polymeric phenolic compound contains 12 to 32 carbon atoms, 2 to 8 oxygen atoms and 10 to 32 hydrogen atoms.

5. The coating composition according to claim 1, wherein the non-polymeric phenolic compound is represented by one of the following Formulae (I), (II) and (III):

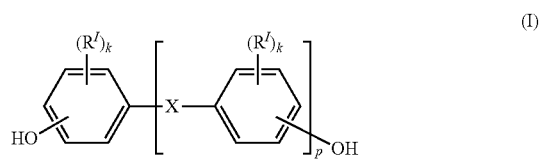

-continued

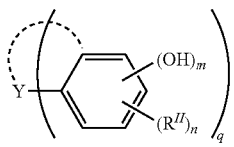
(II)

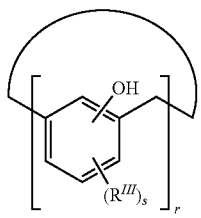
(III)

wherein in Formula (I):
X represents —CO—, —SO$_2$—, —O— or a linear or branched alkylene group having 1 to 5 carbon atoms, which may be fluorinated, or X is absent;
R$^I$ represents at each occurrence independently from each other hydroxyl, alkyl
having 1 to 5 carbon atoms, or phenyl;
k is an integer from 0 to 4; and
p is an integer from 1 to 3;
wherein in Formula (II):
Y represents a saturated or unsaturated hydrocarbyl moiety, which may be fluorinated and/or may contain one or more hydroxyl groups, wherein Y may be linked to one or more of the adjacent aromatic units independently from each other via a second bond

to form a bi- or multicyclic system;
R$^{II}$ represents at each occurrence independently from each other hydroxyl, alkyl having 1 to 5 carbon atoms, or phenyl;
m is at each occurrence independently from each other an integer from 1 to 5;
n is at each occurrence independently from each other an integer from 0 to 4; and
q is an integer from 2 to 4; and
wherein in Formula (III):
R$^{III}$ represents at each occurrence independently from each other alkyl having 1 to 5 carbon atoms;
s is an integer from 0 to 3; and
r is 3 or 4.

6. The coating composition according to claim 1, wherein the non-polymeric phenolic compound is a compound of Formula (I-A) or Formula (I-B):

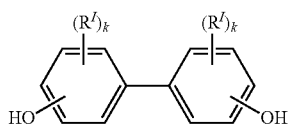
(I-A)

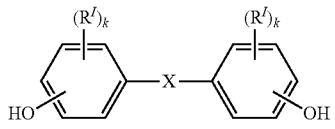
(I-B)

wherein

X represents —CO—, —SO$_2$—, —O—, or a linear or branched alkylene group having 1 to 5 carbon atoms, which may be fluorinated;

R$^I$ represents at each occurrence independently from each other hydroxyl, alkyl having 1 to 5 carbon atoms, or phenyl; and k is an integer from 0 to 4.

7. The coating composition according to claim 1, wherein the non-polymeric phenolic compound is a compound of Formula (I-A), (II-B), (II-C), (II-D), (II-E), (II-F) or (II-G):

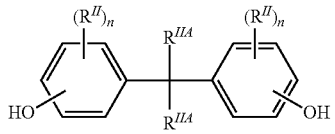
(II-A)

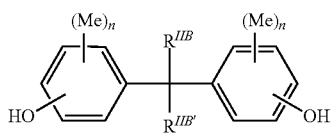
(II-B)

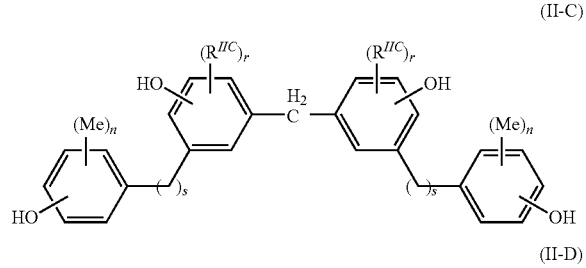
(II-C)

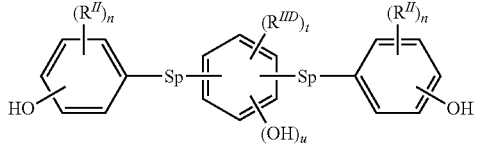
(II-D)

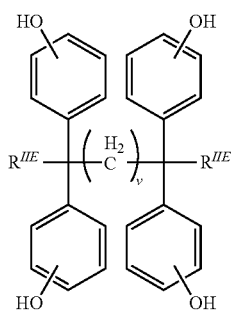
(II-E)

-continued

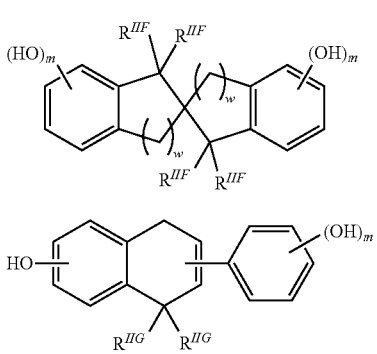
(II-F)

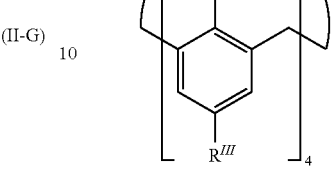
(II-G)

wherein in Formula (II-A):
$R^{II}$=Me or Ph; $R^{IIA}$=Ph, —C₆H₄—OH, —CH₂—C₆H₄—OH or —CH₂CH₂—C₆H₄—OH; or
both $R^{IIA}$ together form a fluorenylene group or cyclohexylene group, which may be substituted with —OH or —C₆H₄—OH; and
n=0 or 1;
wherein in Formula (II-B):
$R^{IIB}$=H or Me;
$R^{IIB'}$=-Ph, —C₆H₄—OH or —C₆H₄—C(CH₃)₂—C₆H₄—OH; and
n=0 or 1;
wherein in Formula (II-C):
$R^{IIC}$ represents alkyl having 1 to 3 carbon atoms;
n=0 or 1;
r=0, 1 or 2; and
s=0, 1, 2 or 3;
wherein in Formula (II-D):
$R^{II}$=Me or Ph; $R^{IID}$ represents alkyl having 1 to 3 carbon atoms;
Sp represents a linear or branched alkylene group having 1 to 5 carbon atoms;
n=0 or 1;
t=0 or 1; and
u=0 or 1;
wherein in Formula (II-E):
$R^{IIE}$=H or Me; and
v=0, 1, 2 or 3;
wherein in Formula (II-F):
$R^{IIF}$=H or Me; and
m=1, 2 or 3; and
wherein in Formula (II-G):
$R^{IIG}$=H or Me; and
m=1, 2 or 3.

8. A coating composition, comprising:
a silazane-containing polymer; and
a non-polymeric phenolic compound:
wherein the non-polymeric phenolic compound comprises at least two and not more than four aromatic units in its molecular structure, and
wherein the silazane-containing polymer comprises a repeating unit $M^1$ represented by Formula (1):

—[SiR¹R²—NR³—]   (1)

wherein
$R^1$ is alkenyl having 2 to 30 carbon atoms;
$R^2$ is hydrogen, alkyl having 1 to 30 carbon atoms, or alkenyl having 2 to 30 carbon atoms; and
$R^3$ is hydrogen, alkyl having 1 to 30 carbon atoms, alkenyl having 2 to 30 carbon atoms, or aryl having 2 to 30 carbon atoms;

wherein the non-polymeric phenolic compound is a compound of Formula (III-A) or (III-B):

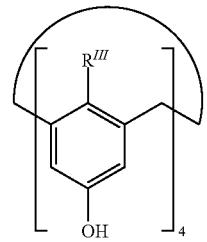
(III-A)

(III-B)

wherein $R^{III}$ represents at each occurrence independently from each other alkyl having 1 to 5 carbon atoms.

9. The coating composition according to claim 1, wherein the silazane-containing polymer further comprises a repeating unit $M^2$ represented by Formula (2):

—[SiR⁴R⁵—NR⁶—]   (2)

wherein $R^4$, $R^5$ and $R^6$ are the same or different from each other and are independently selected from hydrogen, an organic group, a heteroorganic group, or a combination thereof.

10. The coating composition according to claim 1, wherein the silazane-containing polymer further comprises a repeating unit $M^3$ represented by Formula (3):

—[SiR⁷R⁸—O—]   (3)

wherein $R^7$ and $R^8$ are the same or different from each other and are independently selected from hydrogen, an organic group, a heteroorganic group, or a combination thereof.

11. The coating composition according to claim 1, wherein the composition further comprises one or more solvents.

12. The coating composition according to claim 1, wherein the composition further comprises one or more additives.

13. A method for preparing a coated article, wherein the method comprises:
applying a coating composition according to a surface of an article, wherein the coating composition comprises:
a silazane-containing polymer; and
a non-polymeric phenolic compound, and wherein the non-polymeric phenolic compound comprises at least two and not more than four aromatic units in its molecular structure; and
curing said coating composition to obtain a coated article.

14. The method according to claim 13, wherein the coating composition applied in step (a) is previously provided by mixing a first component comprising a silazane-containing polymer with a second component comprising a non-polymeric phenolic compound, wherein the silazane-containing polymer comprises a repeating unit $M^1$ represented by Formula (1):

$$—[SiR^1R^2—NR^3—]\quad (1)$$

wherein
$R^1$ is alkenyl having 2 to 30 carbon atoms;
$R^2$ is hydrogen, alkyl having 1 to 30 carbon atoms, or alkenyl having 2 to 30 carbon atoms; and
$R^3$ is hydrogen, alkyl having 1 to 30 carbon atoms, alkenyl having 2 to 30 carbon atoms, or aryl having 2 to 30 carbon atoms; and wherein the non-polymeric phenolic compound is represented by one of the following Formulae (I), (II) and (III):

(I)

(II)

(III)

wherein in Formula (I):
X represents —CO—, —SO$_2$—, —O— or a linear or branched alkylene group having 1 to 5 carbon atoms, which may be fluorinated, or X is absent;
$R^I$ represents at each occurrence independently from each other hydroxyl, alkyl having 1 to 5 carbon atoms, or phenyl;
k is an integer from 0 to 4; and
p is an integer from 1 to 3;

wherein in Formula (II):
Y represents a saturated or unsaturated hydrocarbyl moiety, which may be fluorinated and/or may contain one or more hydroxyl groups, wherein Y may be linked to one or more of the adjacent aromatic units independently from each other via a second bond to form a bi- or multicyclic system;
$R^{II}$ represents at each occurrence independently from each other hydroxyl, alkyl having 1 to 5 carbon atoms, or phenyl;
m is at each occurrence independently from each other an integer from 1 to 5;
n is at each occurrence independently from each other an integer from 0 to 4; and
q is an integer from 2 to 4; and wherein in Formula (III):
$R^{III}$ represents at each occurrence independently from each other alkyl having 1 to 5 carbon atoms;
s is an integer from 0 to 3; and
r is 3 or 4.

15. A coated article, obtainable by the method according to claim 13.

16. A method for preparing a coated article, wherein the method comprises the following steps:
applying a coating composition according to claim 1 to a surface of an article; and
curing said coating composition to obtain a coated article.

17. The method according to claim 13, wherein the total content of the non-polymeric phenolic compound in the coating composition is in the range from 10 to 90 weight-%, based on the total weight of silazane-containing polymer in the coating composition.

18. The coating composition according to claim 1, wherein the total content of the non-polymeric phenolic compound in the coating composition is in the range from 15 to 75 weight-%, based on the total weight of silazane-containing polymer in the coating composition.

19. The coating composition according to claim 1, wherein the total content of the silazane-containing polymer in the coating composition is in the range from 10 to 90 weight-%, based on the total weight of the coating composition.

20. The coating composition according to claim 1, wherein the total content of the silazane-containing polymer in the coating composition is in the range from 25 to 85 weight-%, based on the total weight of the coating composition.

21. The coating composition according to claim 1, wherein the coating composition further comprises a catalyst selected from UV or thermal radical initiators.

22. The method according to claim 13, wherein the non-polymeric phenolic compound is a compound of Formula (I-A) or Formula (I-B):

(I-A)

(I-B)

wherein
X represents —CO—, —SO$_2$—, —O—, or a linear or branched alkylene group having 1 to 5 carbon atoms, which may be fluorinated;
$R^I$ represents at each occurrence independently from each other hydroxyl, alkyl having 1 to 5 carbon atoms, or phenyl; and
k is an integer from 0 to 4.

23. The method according to claim 13, wherein the non-polymeric phenolic compound is a compound of Formula (II-A), (II-B), (II-C), (II-D), (II-E), (II-F) or (II-G):

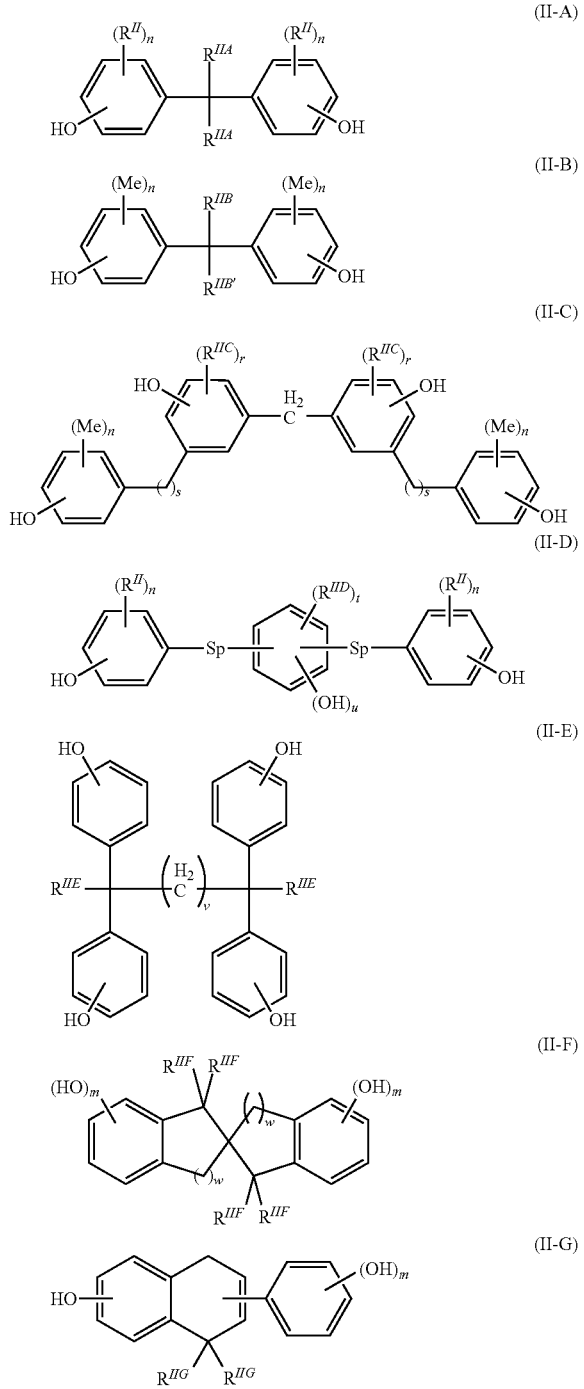

(II-A)
(II-B)
(II-C)
(II-D)
(II-E)
(II-F)
(II-G)

wherein in Formula (II-A):
 $R^{II}$=Me or Ph; $R^{IIA}$=Ph, —$C_6H_4$—OH, —$CH_2$—$C_6H_4$—OH or —$CH_2CH_2$—$C_6H_4$—OH; or both $R^{IIA}$ together form a fluorenylene group or cyclohexylene group, which may be substituted with —OH or —$C_6H_4$—OH; and
 n=0 or 1;
wherein in Formula (II-B):
 $R^{IIB}$=H or Me;
 $R^{IIB'}$=-Ph, —$C_6H_4$—OH or —$C_6H_4$—C(CH$_3$)$_2$—$C_6H_4$—OH; and
 n=0 or 1;

wherein in Formula (II-C):
 $R^{IIC}$ represents alkyl having 1 to 3 carbon atoms;
 n=0 or 1;
 r=0, 1 or 2; and
 s=0, 1, 2 or 3;
wherein in Formula (II-D):
 $R^{II}$=Me or Ph; $R^{IID}$ represents alkyl having 1 to 3 carbon atoms;
 Sp represents a linear or branched alkylene group having 1 to 5 carbon atoms;
 n=0 or 1;
 t=0 or 1; and
 u=0 or 1;
wherein in Formula (II-E):
 $R^{IIE}$=H or Me; and
 v=0, 1, 2 or 3;
wherein in Formula (II-F):
 $R^{IIF}$=H or Me; and
 m=1, 2 or 3; and
wherein in Formula (II-G):
 $R^{IIG}$=H or Me; and
 m=1, 2 or 3.

24. The method according to claim 13, wherein the non-polymeric phenolic compound is a compound of Formula (III-A) or (III-B):

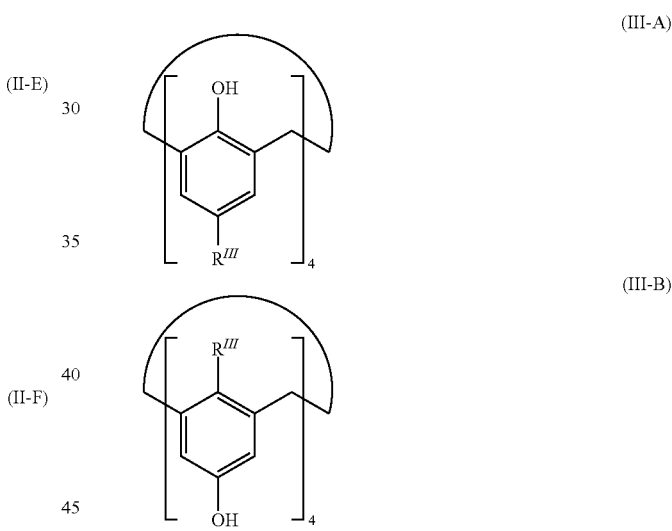

(III-A)
(III-B)

wherein $R^{III}$ represents at each occurrence independently from each other alkyl having 1 to 5 carbon atoms.

25. The method according to claim 13, wherein the silazane-containing polymer further comprises a repeating unit $M^2$ represented by Formula (2):

$$—[SiR^4R^5—NR^6—] \quad (2)$$

wherein $R^4$, $R^5$ and $R^6$ are the same or different from each other and are independently selected from hydrogen, an organic group, a heteroorganic group, or a combination thereof.

26. The method according to claim 13, wherein the silazane-containing polymer further comprises a repeating unit $M^3$ represented by Formula (3):

$$—[SiR^7R^8—O—] \quad (3)$$

wherein $R^7$ and $R^8$ are the same or different from each other and are independently selected from hydrogen, an organic group, a heteroorganic group, or a combination thereof.

* * * * *